(12) United States Patent
Rios (10) Patent No.: US 6,694,228 B2
(45) Date of Patent: Feb. 17, 2004

(54) CONTROL SYSTEM FOR REMOTELY OPERATED VEHICLES FOR OPERATIONAL PAYLOAD EMPLOYMENT

(75) Inventor: Jeffrey P. Rios, Easton, CT (US)

(73) Assignee: Sikorsky Aircraft Corporation, Stratford, CT (US)

(*) Notice: Subject to any disclaimer, the term of this patent is extended or adjusted under 35 U.S.C. 154(b) by 0 days.

(21) Appl. No.: 10/143,085

(22) Filed: May 9, 2002

(65) Prior Publication Data

US 2003/0212478 A1 Nov. 13, 2003

(51) Int. Cl.[7] .............................................. G06F 15/80
(52) U.S. Cl. .................................. 701/2; 701/3; 701/23; 701/28; 340/989; 244/17.13; 244/189; 244/190
(58) Field of Search .............................. 701/2, 3, 4, 23, 701/28; 340/989; 244/17.13, 189, 190

(56) References Cited

U.S. PATENT DOCUMENTS

| | | | |
|---|---|---|---|
| 3,742,495 A | * | 6/1973 | Diamantides ................ 342/64 |
| 5,429,089 A | | 7/1995 | Thornberg et al. |
| 5,552,983 A | | 9/1996 | Thornberg et al. |
| 5,676,334 A | | 10/1997 | Cotton et al. |
| 5,716,032 A | | 2/1998 | McIngvale |
| 5,904,724 A | * | 5/1999 | Margolin ................. 701/120 |
| 5,923,270 A | | 7/1999 | Sampo et al. |
| 5,971,325 A | | 10/1999 | Gold et al. |
| 6,025,790 A | | 2/2000 | Saneyoshi |
| 6,059,226 A | | 5/2000 | Cotton et al. |
| 6,076,024 A | | 6/2000 | Thornberg et al. |
| 6,092,007 A | | 7/2000 | Cotton et al. |
| 6,140,958 A | | 10/2000 | Johnson et al. |
| 6,148,250 A | | 11/2000 | Saneyoshi et al. |
| 6,539,290 B1 | * | 3/2003 | Vos ............................... 701/3 |

FOREIGN PATENT DOCUMENTS

JP 08164896 A * 6/1996 ........... B64C/13/20

OTHER PUBLICATIONS

Ruff et al., "An Architecture for Modeling Uninhabited Aerial Vehicles", IEEE 1999, I–744–749.*

* cited by examiner

*Primary Examiner*—Michael J. Zanelli
*Assistant Examiner*—Eric M Gibson
(74) *Attorney, Agent, or Firm*—Carlson, Gaskey & Olds (57) ABSTRACT

A control system for a UAV includes control translations which maximize operational employment of the UAV payload. By determining spatial references, and then using the references to transform the control stick commands, the operator treats the UAV as a point source. For control through imagery from onboard mission sensors, the transformations provide for the UAV to move itself and achieve payload orientation.

18 Claims, 8 Drawing Sheets

CONTROL SYSTEM FOR REMOTELY OPERATED VEHICLES FOR OPERATIONAL PAYLOAD EMPLOYMENT

BACKGROUND OF THE INVENTION

The present invention relates to the control of remotely operated vehicles, and more particularly to intuitive control for a remotely operated vehicle which maximizes sensor employment.

There is an increased emphasis on the use of unmanned air vehicles (UAV) for performing various activities in both civilian and military situations where the use of manned flight vehicles may not be appropriate. Such missions include surveillance, reconnaissance, target acquisition, target designation, data acquisition, communications relay, decoy, jamming, harassment, ordinance delivery, or supply.

Similarly, it has long been the practice of remotely controlling weapons such as a torpedo or anti-tank missile for ordinance delivery. Such control may take place when the weapon is beyond the visual line of sight of the operator.

The primary objective of a UAV operator is to position the UAV such that its payload (typically a sensor turret of some type) is pointed at the area of interest. Controlling the UAV beyond visual line of sight requires the use of moving icons on a map display and/or control through on-board imagery displayed in the base station. This may be even more difficult than controlling the UAV visually as the operator must mentally consider the UAV orientation to ensure the correct control input is provided.

Most map displays are not fixed. That is, the map display may be rotated such that north is not always facing up. The operator must then consider both the UAV orientation and the map orientation. In like manner, controlling the air vehicle by "flying it through its camera," i.e., controlling the UAV via the imagery from its on-board sensor, requires the operator to take into account the sensor LOS in order to determine the correct control input. This may further complicate control as the sensor turret may not coincide with the UAV heading.

Existing methods for controlling UAVs rely greatly on operator skill. With a considerable amount of training, an operator can learn to operate a UAV proficiently. However, under high workload and stress conditions, such as when the UAV is controlled from a cockpit of manned aircraft, the non-intuitive control of a UAV having many variable references may result in undesirable operational effectiveness of the UAV.

Accordingly, it is desirable to provide a control system for a UAV which does not require an operator to consider the relationship of UAV orientation, Map orientation and the UAV sensor orientation to thereby minimize training requirements and provides maximum operational employment of the UAV payload.

SUMMARY OF THE INVENTION

The present invention provides a control system for a UAV including translations which translate remote control commands to maximize operational employment of the UAV payload. Without these translations, an operator must mentally calculate the necessary control stick inputs to move the UAV toward a desired position seen on the map or on the sensor imagery. By first determining the operator's spatial reference, and then using the reference to transform the control stick commands, the operator treats the UAV as a point source.

For control through onboard mission sensor imagery, the transformations of the present invention removes the operator from control of the UAV by commanding the UAV to move itself to achieve the desired payload orientation. This permits a novice operator, with little knowledge of flight control operations, to fly the UAV remotely, beyond visual line of sight. This capability is especially beneficial for an operator in a high workload environment such as from the cockpit of a manned vehicle.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
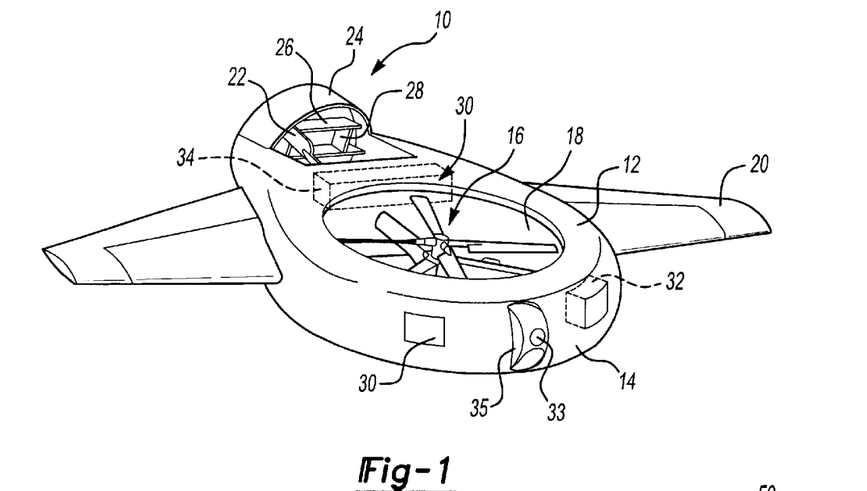
FIG. 1 is a general perspective view of an exemplary remote controlled vehicle for use with the present invention.

FIG. 1A illustrates a remotely controlled vehicle 10, such as the Unmanned Aerial Vehicle (UAV) developed by Sikorsky Aircraft Corporation. For further understanding of the UAV embodiment and associated components thereof, attention is directed to U.S. patent application Ser. No. 09/296,624 filed Apr. 22, 1999 and entitled "Unmanned Aerial Vehicle With Counter-Rotating Ducted Rotors and Shrouded Pusher-Prop," which is assigned to the assignee of the instant invention and which is hereby incorporated herein in its entirety. The present invention will be described in the context of a UAV, however, it will be understood by those skilled in the art that the control system of the present invention may be applied to any remote controlled vehicle or weapon system which requires control beyond visual line of sight.

The vehicle 10 includes a fuselage 12 with a toroidal portion 14 having a generally hemi-cylindrical aerodynamic profile. A rotor assembly 16 is mounted within a duct 18 that extends substantially vertically through the fuselage 12. Wings 20 extend laterally outward from the aircraft fuselage 12 to provide high lifting forces and a nose-down pitching moment in forward translational flight. Those skilled in the art will readily appreciate the diverse wing and non-wing arrangements that can be incorporated into a UAV according to the present invention.

To provide translational thrust, a pusher prop 22 is mounted to the rear of the vehicle 10. A prop shroud 24 is preferably formed around the pusher prop 22. Mounted on the shroud 24 aft of the pusher prop 22 are one or more horizontal and vertical control surfaces 26, 28. The control surfaces 26, 28 are pivotally mounted to the shroud 24 to permit the exhausted air to be channeled in a controllable manner such that the horizontal control surfaces 26 function as elevators and the vertical control surfaces 28 function as rudders.

The fuselage 12 includes a plurality of accessible internal bays 30 for housing and/or storing aircraft flight and mission components. Preferably, the bays house a power plant system 32 to drive the rotor system 16 and the pusher prop 22 and a flight control system 34.

One or more mission sensors 33, such as a passive sensor, e.g., infrared detectors, forward looking infrared radar (FLIR) sensors, thermal imager, television cameras, etc., and/or active devices, e.g., lasers, communications gear, radar, or the like preferably located in a trainable turret 35 (FIG. 1) in a forward area of the vehicle 10. It should be understood that although a particular component arrangement is disclosed in the illustrated embodiment, other arrangements will benefit from the instant invention.

Figure 2:
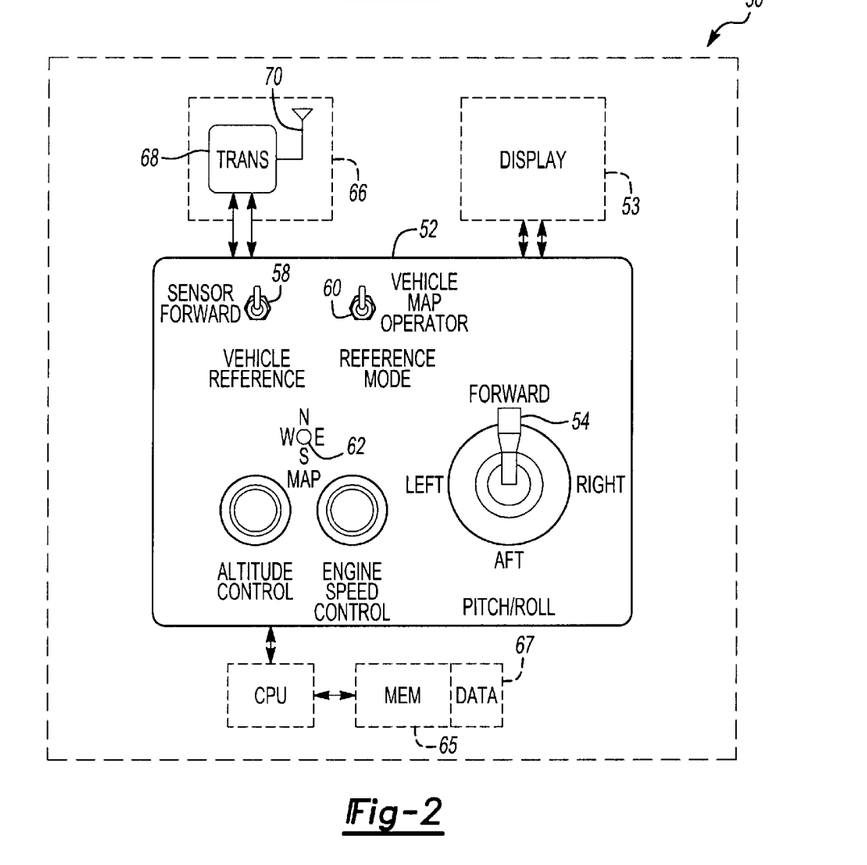
FIG. 2 is a general schematic block diagram of a remote control base station.

Referring to FIG. 2, the flight control system 34 preferably includes a CPU such as a flight control computer 36 and storage device 38 connected to the CPU 36. The storage device 38 may include a hard drive, CD ROM, DVD, RAM, ROM or other optically readable storage, magnetic storage or integrated circuit. As will be further described, the storage device 38 contains a database 40 including preprogrammed flight control law strategy for the control of the vehicle dynamics through servo actuators and a mixing circuit or the like. The control law strategy preferably controls parameters such as pitch attitude, roll attitude, heading, and altitude to provide control of the vehicle 10.

The flight control system 34 may alternatively or additionally include a Primary Flight Control System (PFCS) and an Automatic Flight Control Systems (AFCS) as are well known. The AFCS and PFCS software algorithms may be stored in the storage device 38 or alternatively in removable ROM, RAM or flash memory. The AFCS and PFCS provide feedback mechanisms having linear control system logic such as proportional, integral, derivative (PID) paths to achieve the desired response and compensate for undesired destabilization forces acting on the vehicle 10.

The flight control system 34 further includes communications gear (illustrated schematically at 42) for relaying real time sensor data and receiving real time command input signals through an antenna 44 and a signal decoder 46 and receiver 48 which communicate with the CPU 36. It should be understood that other systems component including but not limited to an on-board navigation system 47 with position sensors, attitude sensors, GPS receivers, multi-axis accelerometers, gyros, compasses, altimeters, etc may additionally or alternatively communicate with the CPU 36 to detect and control vehicle dynamics and flight path parameters. The sensors may also include any device capable of outputting an acceleration vector signal representing sensed vehicle motion and/or receiving control surface displacement. Such devices (as well as others) are well known.

The flight control system 34 described thus far is exemplary of the type which maybe used in a UAV. However, as will be understood by those skilled in the art, a separate flight control computer, avionics, and navigation system are not necessarily required in order to perform the functions identified in the present invention. Alternatively, a single flight control computer or mission computer may be provided.

Referring to FIG. 2A, a base station (illustrated somewhat schematically at 50) including a controller 52 and a display 53 for remote operator control of the vehicle 10 is schematically illustrated. The controller 55 is provided with a control stick 54 for providing control inputs to control the operation of the UAV. The control stick 54 illustrated as being a multi-axis control stick wherein forward and aft movement of the control stick relates to pitch, and side-to-side movement of the control stick related to roll. It should be understood that other input devices such as a mouse, trackball, touch screen or the like will also benefit from the present invention. The controller 52 is also preferably provided with a vehicle reference switch 58, a reference mode switch 60 and a map orientation control 62 as will be further described.

The controller 52 includes abase station CPU 64 and storage device 65 connected to the CPU 64 (all illustrated schematically). The storage device 65 contains a database 67 including transformations and logic to provide intuitive control of the UAV by receiving the control commands provided by the control stick 54 and converting them into is signals to be transmitted via base station communications equipment 66. The communications equipment 66 includes a transmitter 68 for transmitting control commands from the controller 52 via a base station antenna 70. It should be understood that although the base station is described as a transmitter and the vehicle is described as a receiver, both the vehicle 10 and the base station 52 both transmit and receive from/to each other such as, for example only, when the vehicle 10 transmits imagery from sensor 33.

Figure 3:
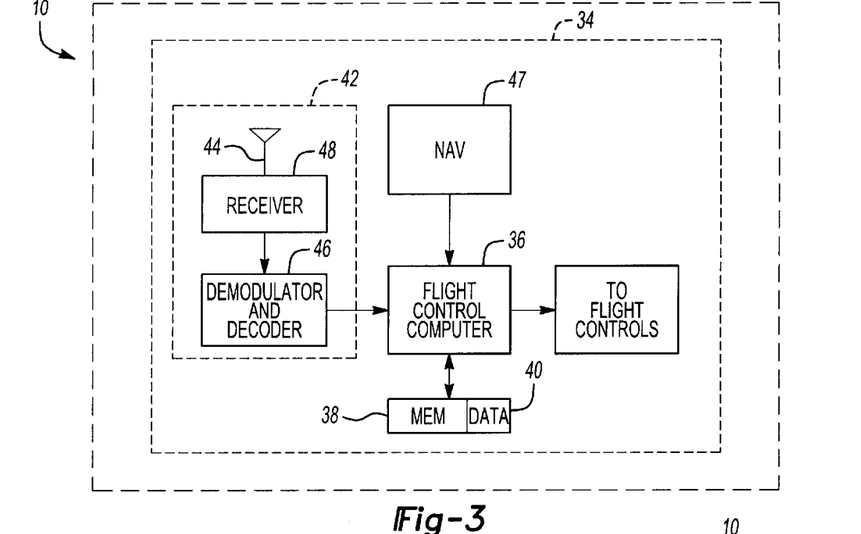
FIG. 3 is a general schematic block diagram of a remote control vehicle in communication with the base station of FIG. 2.

Referring to FIG. 3, when the controller 52 via the base station antenna 70 transmits control signals, the control signals are received by the flight control system 34 though the UAV antenna 44. The demodulated and decoded control signals are provided to the CPU 36 which process the incoming control signals to be implemented according to its airframe specific control surfaces to perform the commanded maneuvers. Preferably, the UAV 10 receives control commands as X and Y commands which are locally converted into pitch and roll commands by the CPU 36 for communication to the flight control system 34.

Figure 4:
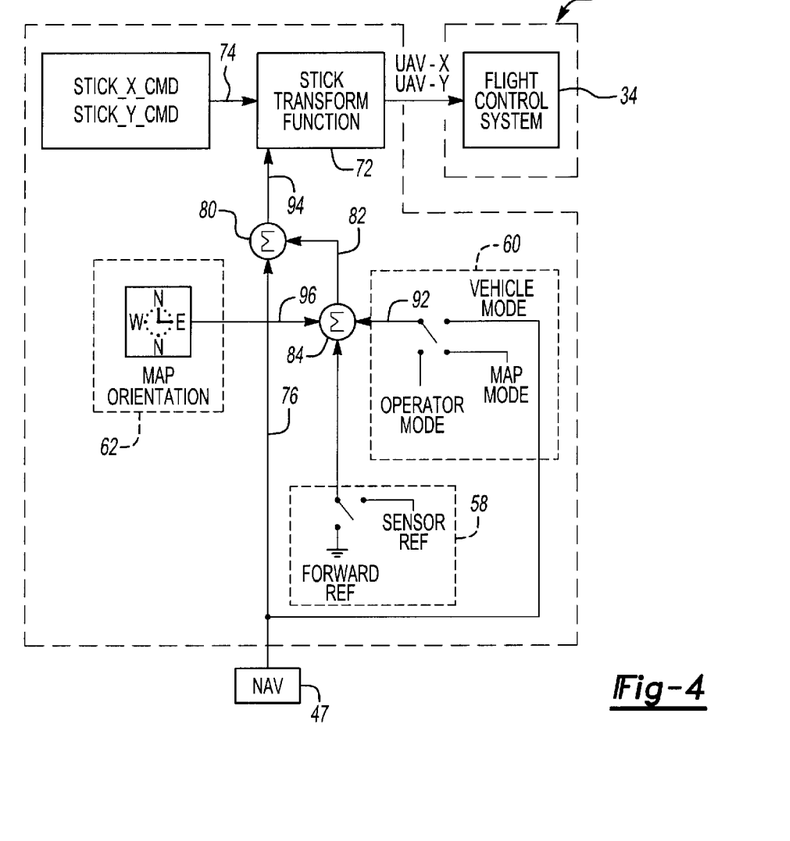
FIG. 4 is a schematic diagram of a translation function according to the present invention.

Referring to FIG. 4, a stick transformation function 72 is preferably stored in database 67 to allow the operator to select between a variety of control references for controlling the UAV 10. Repositioning a switch or entering a command on the controller 52 selects a vehicle reference, a reference mode and map orientation. Thereafter, the reference command is provided via the communications equipment and control panel antenna to the flight control computer via the communications equipment on the remotely operated vehicle.

The stick transformation function 72 is responsive to control signals received from the controller 52 and vehicle heading information for controlling the vehicle in accordance with the desired mode and reference. The stick_X_Cmd and stick_Y_Cmd (provided from the control stick 54 of the controller 52) is provided on a line 74 to the stick transformation function 72. Preferably, the stick commands are limited to +/−10 in X and Y, however, other inputs will also benefit from the present invention.

Another input to the stick transformation function 72 is a reference angle. The reference angle is determined based on the true heading of the vehicle as determined by the navigation system 47 (FIG. 3). The true heading signal is preferably indicative of the orientation of a fixed point on the aircraft with respect to true north. Typically, the reference point on the vehicle is determined to be the forward section on the vehicle as determined by design or other method such as using a center of gravity calculation. The center of gravity is preferably used for the toroidal shape because the forward flight characteristics of the vehicle are improved. The true heading signal provided by the navigation system 47 is provided on a line 76 to a summing junction 80. The other input to the summing junction 80 is a reference heading signal on a line 82 which is provided as the output of a summing junction 84.

Figure 5A:
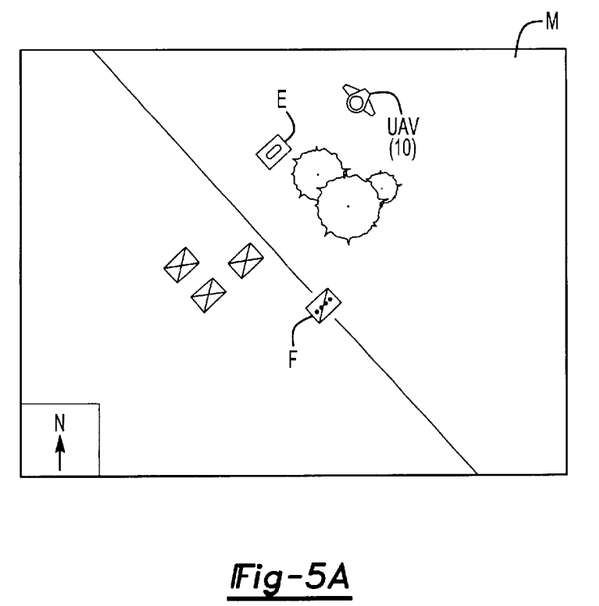
FIG. 5A is a map view in North-up orientation.
Figure 5B:
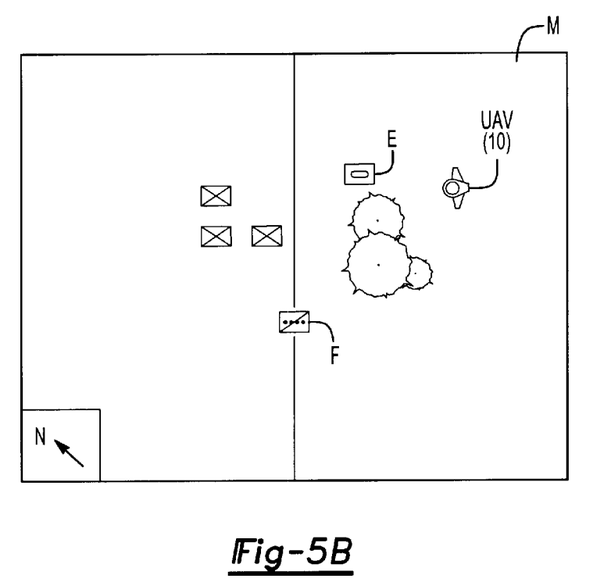
FIG. 5B is the map view of FIG. 5A in an operator-defined orientation.

One input to the summing junction 84 is a vehicle reference signal on a line 86 as selected by the vehicle reference switch 58 (also illustrated in FIG. 5). If the control panel vehicle reference switch 58 is in the FORWARD reference mode position (FIG. 5), then the vehicle reference for purposes of vehicle control is the forward reference position on the UAV 10. If the control panel vehicle reference switch 58 is in the SENSOR reference mode position, then control of the UAV 10 will be based on sensor 33 position which may differ from the vehicle heading. The angular position between the forward position on the vehicle and the sensor position on the vehicle is defined as the Sensor azimuth offset from front of UAV ($\Phi$).

Another input to the summing junction 84 is a reference signal on a line 92 provided by the reference switch 60 (also illustrated in FIG. 5). In a VEHICLE mode, the forward or sensor reference mode from switch 58 defines the reference axis. In a MAP mode, an earth reference, such as North, defines the reference axis. In an OPERATOR mode, the operator provides the reference axis. The output of the summing junction 84 is the reference heading signal on line 82 which is provided to the summing junction 80. The output of the summing junction 80 provides the reference angle to the stick transformation function 72 on a line 94.

Another input to the summing junction 88 is a map orientation signal on a line 96 provided by the map orientation control 62 (also illustrated in FIG. 2). Most map displays are not fixed, such that North need not always be facing up. To improve and operator's situational awareness and spatial orientation the map may be rotated. A typical map display may be a digitized paper chart or a digital map in which the map orientation refers to the rotated direction of the map.

For example only, an area of interest to the operator includes a North West road R (FIG. 5A) upon which a friendly element F is traveling. The Operator can adjust the map orientation control 62 to rotate the map display M such that the road is displayed vertically (FIG. 5B) on the map display M. Such an orientation may provide more intuitive operation orientation, and instructions or warnings to the friendly element F, e.g., to friendly element F: enemy element E off right side of the road R. It should be understood that a road is described for illustrative purposes and any orientation of any reference will also benefit from the present invention.

Once the map display is reoriented, operators heretofore must take into account the orientation of the UAV, orientation of the map, and the sensor line of sight to maintain situation awareness and to properly control the UAV. For example, if the map is rotated such that North is facing the top left of the display (FIG. 5B), then the "top" of the map display is North East. If the UAV 10 heading is Southwest, then the operator must consider both the UAV heading and map orientation to realize that if he wants the UAV to move towards the top of the display, he must move the joystick down and to the right to make the UAV move North. Under high workload and stress conditions, such as when the UAV is controlled from a cockpit of manned aircraft, this conventional non-intuitive control of a UAV may result in undesirable operational effectiveness.

Figure 6:
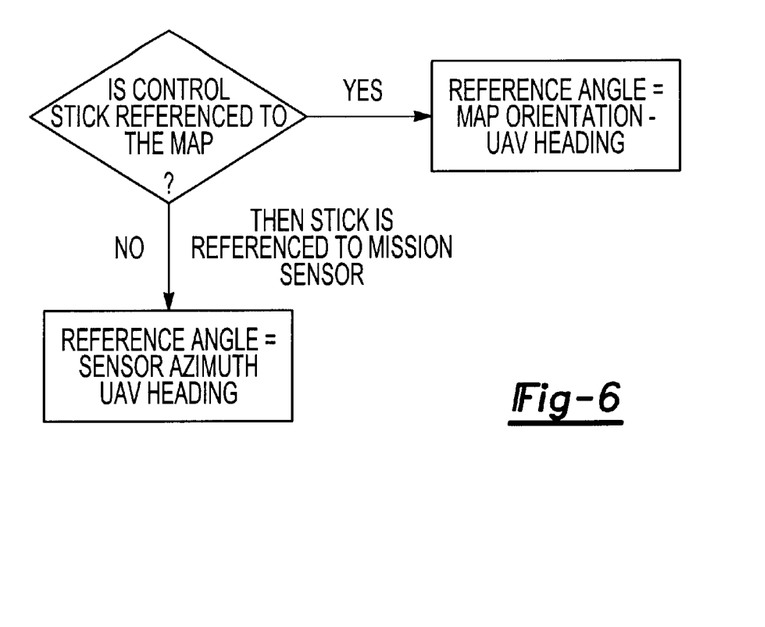
FIG. 6 is a flow chart for the remote control base station.

Referring to FIG. 6, logic stored within the base station storage device 67 is illustrated as a flowchart. When the reference mode switch 60 (FIG. 2) is set to MAP reference mode, the reference angle is determined by equation 1:

$$\text{Reference angle} = \text{Map orientation} - \text{UAV heading} \qquad \text{(Eq. 1)}$$

When the reference mode switch 60 (FIG. 5) is not set to MAP reference mode, the reference angle is determined by equation 2:

$$\text{Reference angle} = \text{Sensor Azimuth} - \text{UAV heading} \qquad \text{(Eq. 2)}$$

Where all angles are given with respect to true North.

Figure 7A:
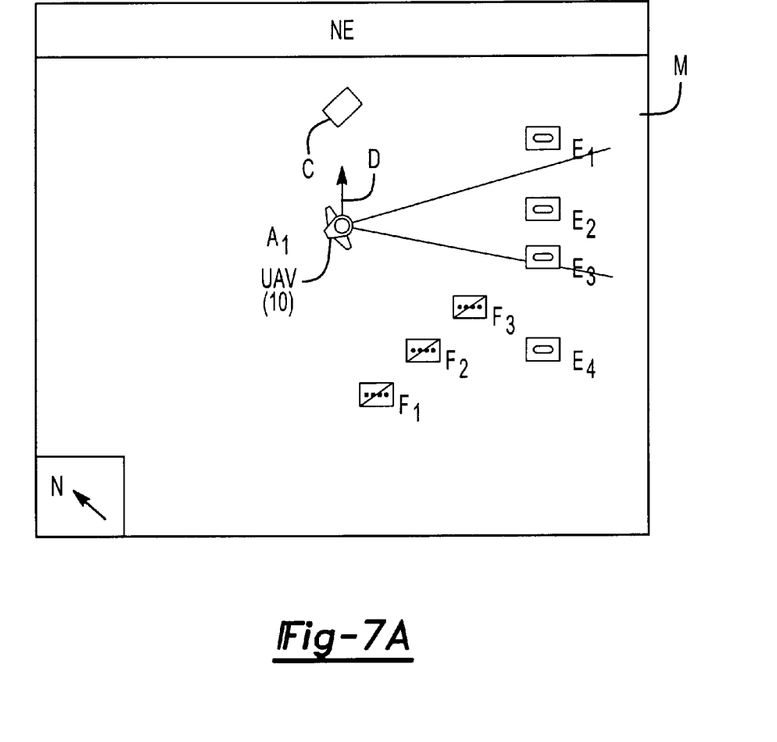
FIG. 7A is a first map display.

Referring to FIG. 7A, operation of the invention is best understood by example. With regard to MAP reference mode, if the map is rotated such that North is facing the top left of the display, then the "top" of the map display is North East. That is, the Map orientation is 45 degrees. If the UAV is heading due East, the UAV heading is 90 degrees as related to true North.

The operator desires to fly toward a specific point (object C) on the digital map. At that instant, the UAV is at position A and object C is −45 degrees relative to the nose of the UAV 10. In the mode of "stick referenced to map", the operator need only push the control stick straight up, i.e., at object C such that the UAV moves straight up, along the line designated as object D on the digital map.

This scenario may be particularly difficult to calculate if there are cross-winds which require the UAV to yaw to maintain its nose into the wind while traveling along the desired flight path. In other words, the course may be 90 degrees (East), but cross winds force the nose of the UAV (i.e. heading) to be something else to prevent reaching rotor head control limits. In conventional systems where the joystick is referenced to the aircraft (a left input is a left roll command), the operator must determine the relative angles between the object and the UAV heading then determine the proper command to obtain the desired position including any necessary cross-wind correction. The present invention eliminates these heretofore necessary determinations.

For example, if an Operator desires the UAV to move toward the top of the map display M, the operator need only move the control stick in the desired "up" direction toward the top of the map. Moving the control stick up (Control stick X=0, Control stick Y=10) is transformed through the present invention equations 3 and 4.

$$\text{UAV\_X\_Cmd}=(\text{stick\_X\_Cmd})(\text{Cosine}[\text{Reference\_Angle}])+ \\ (\text{stick\_Y\_Cmd})(\text{Sine}[\text{Reference\_Angle}]) \quad \text{(eq. 3)}$$

$$\text{UAV\_Y\_Cmd}=(\text{stick\_Y\_Cmd})(\text{Cosine}[\text{Reference\_Angle}])- \\ (\text{stick\_X\_Cmd})(\text{Sine}[\text{Reference}_{13}\text{ Angle}]) \quad \text{(eq. 4)}$$

Thus, assuming control stick was pushed "up" to a limit of +10:

Reference angle=Map Orientation−UAV heading

Reference angle=+45−90=−45

Then, using equations (3) and (4):

UAV_X_Cmd=(0)(Cosine[−45])+(+10)(Sine[−45])=−7.07

UAV_Y_Cmd==(10)(Cosine[−45])−(0)(Sine[−45])=+7.07

Therefore, the commands actually sent to the UAV would be (approximately) 70% full command to the left (since left is negative), and 70% full command forward (since aft is negative), resulting in a UAV command of North-East (straight upon map display M and toward object C) while maintaining its current heading of East. Thus, regardless of map orientation or UAV heading, if the operator desires to move the UAV to the top of the map, he just pushes the stick "up"; to move to the left of the display, he push the stick "left", and so on. The UAV is thereby directed by equations 3 and 4 where the UAV_X_Cmd and UAV_Y_Cmd may be locally converted to the necessary pitch and roll commands by the on-board flight control system 34.

Figure 7B:
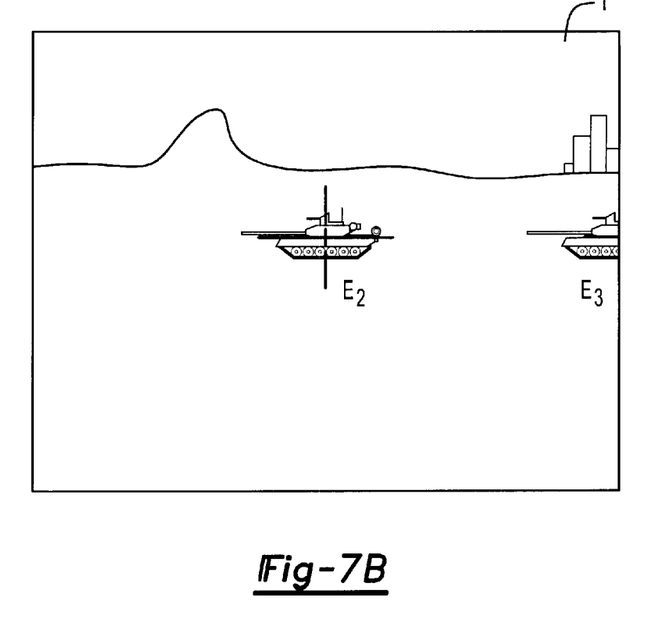
FIG. 7B is a first imagery display from an on-board mission sensor corresponding to FIG. 7A.

When the reference mode switch 60 (FIG. 3) is not set to MAP reference mode, the UAV 10 is controlled through the sensor 33 and the imagery therefrom (FIG. 7B). While map orientation is not relevant when using the sensor 33, the sensor 33 is mounted within turret 35 (FIG. 1) and therefore defines a LOS which is not fixed with reference to the UAV. That is, moving the control stick 56 can slew the sensor 33 or command movement of the UAV 10. Either action results in the moving of imagery from the operator perspective.

Referring to FIG. 7B, a view through the sensor 33 is schematically illustrated with reference to the UAV map position of FIG. 7A. In this scenario, the UAV is hovering at position A and the operator desires to sequentially inspect object E3. Objects E and F may represent vehicles or the like which may not typically be displayed on the map display. It should be understood that objects E and F are shown in the map display M for understanding of the invention. The UAV 10 is heading East (90 degrees true) and the sensor 33 is slewed to South East (135 degrees true).

The present invention allows the operator to simply move the control stick straight right (Control stick X=10, Control stick Y=0) when viewing the imagery of FIG. 7B. All the orientation variables are compensated for by the present invention which provides for intuitive control input as follows using equations (2), (3) and (4):

Reference angle=Sensor Azimuth−UAV heading

Reference angle=+135−90=+45

Then, using equations (3) and (4):

UAV_X_Cmd=(+10)(Cosine[+45])+(0)(Sine[+45])=+7.07

UAV_Y_Cmd=(0)(Cosine[+45]−(+10)(Sine[+45])=−7.07

The commands sent to the UAV would be (approximately) 70% full command to the right (since left is negative), and 70% full command aft (since aft is negative), resulting in a UAV command of South-West while maintaining its current Easterly heading. The present invention therefore eliminates the requirement for the operator to know the current UAV heading, the relative position of the objects of interest and/or the slewed position of the sensor. Using these calculations, the operator need only move the control stick toward the desired object of interest while viewing the sensor imagery. That is, the UAV is basically a point source to the operator. The UAV is directed by equations 3 and 4 which may be locally converted to pitch and roll input on-board the UAV 10.

Figure 7C:
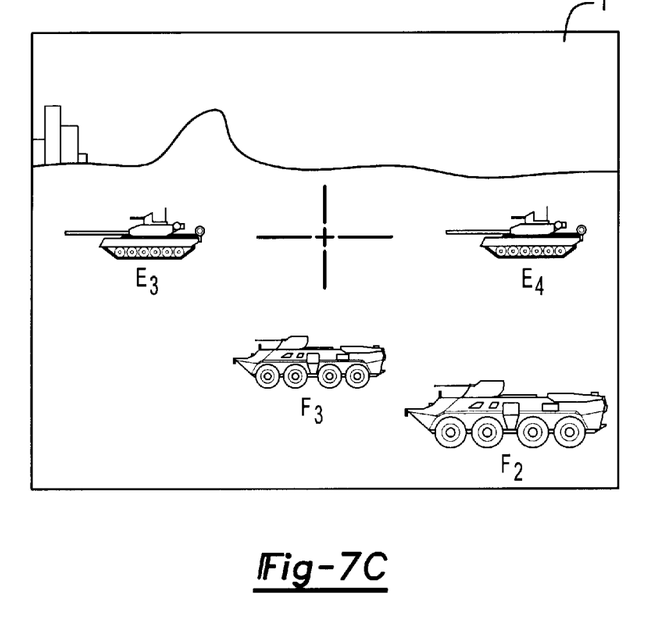
FIG. 7C is a second imagery display corresponding to FIG. 7B.
Figure 7D:
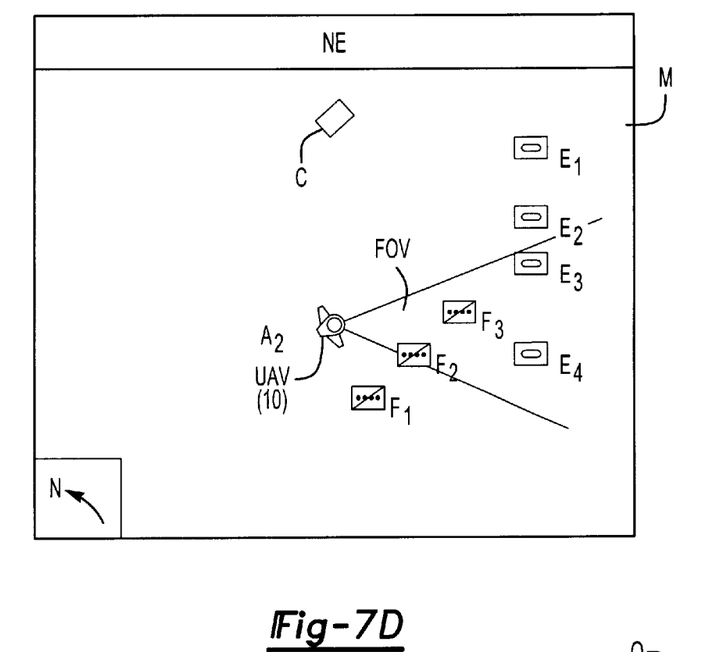
FIG. 7D is a second may display.
Figure 8A:
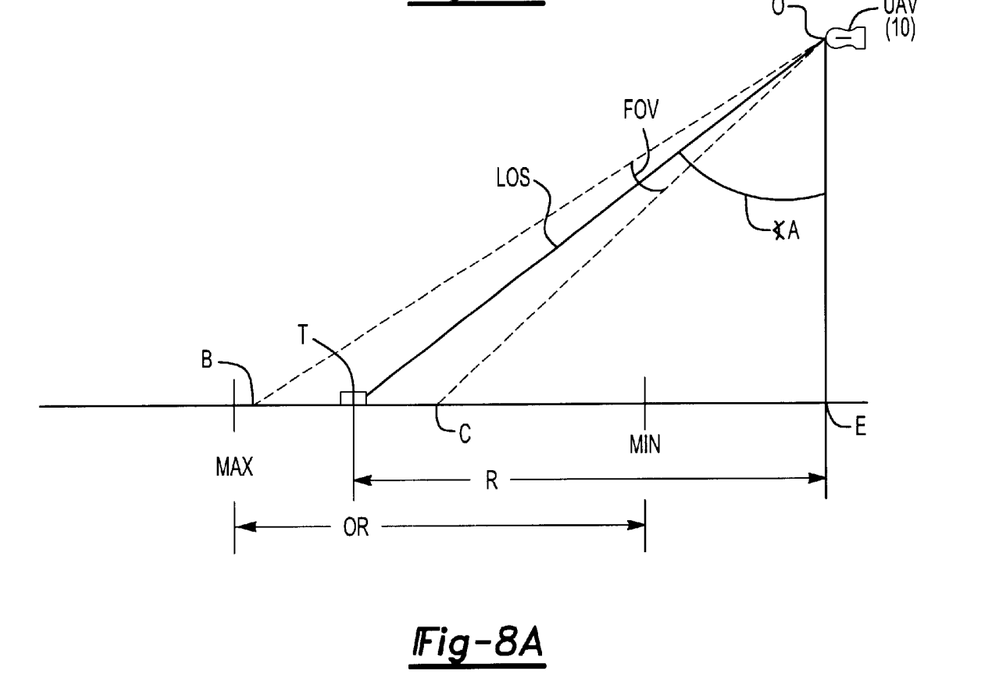
FIG. 8A is a schematic diagram of a sensor operational range.

Referring to FIG. 7C, the operator continues to view objects E, sequentially toward the bottom of the display as illustrated in FIG. 8A. The operator has moved the UAV along the column of objects E until the UAV reaches position A2 (FIG. 7D). Objects F are then identified in the display. Like the FIG. 7B situation, the operator now desires to sequentially scan objects F. As illustrated in FIG. 7C (and FIG. 7D), the imagery indicates that the objects F are aligned down and to the right as object F2 is closer to the UAV than object F3. To sequentially view the objects, (from F3 toward F2; while viewing imagery I of FIG. 7C) the operator need only push the control stick to the right and down (Control stick X=−10, Control stick Y=10). The resulting UAV commands are calculated as follows using equations (2), (3) and (4):

Reference angle=Sensor Azimuth−UAV heading

Reference angle=+135−90=+45

UAV_X_Cmd=(+10)(Cosine[+45])+(−10)(Sine[+45])=0.00

UAV_Y_Cmd=(−10)(Cosine[+45]−(+10)(Sine[+45])=−14.12
[which is limited to −10.0]

Therefore, the X and Y commands sent to the UAV would be 0 X command, and 100% full command aft (since negative is aft), resulting in a UAV command of due West while maintaining its current heading of East. Again, the operator does not have to know the current UAV heading, the relative position of the objects of interest, or the slewed position of the sensor.

Movement of a UAV is primarily to maximize operational employment of the sensor payload. For a UAV which can hover a hover position is selected that will satisfy the operator's desire to view a new object. For fixed wing UAVs, a loiter point (a spot which the air vehicle orbits around) is generated. In any event, the present invention provides a more intuitive, and therefore lower workload operation for either UAV. It should be understood that although the illustrated UAV can hover and is disclosed as maintaining a particular heading, the present invention is equally applicable to loiter point about which a UAV will orbit around while the mission sensor tracks the target. In fact, the present invention provides another benefit in such a situation as the UAV heading, map orientation, and mission sensor azimuth may be continuously changing as the UAV orbits the loiter point.

Referring to FIG. 8A, another intuitive control requirement for control of the UAV through sensor imagery is the determination of when to slew the sensor 33 line of sight (LOS; line O-A) versus moving the UAV 10 to maintain a target T within the sensor 33 field of view (FOV). The sensor LOS is defined as an axis from the UAV 10 along the center of the sensor 33 field of view (FOV; lines O-C and O-D). To provide this requirement, a predefined maximum MAX and minimum MIN sensor range define an operational range OA in which the sensor 33 can "see" from the UAV current position O is defined. It should be understood that multiple maximum ranges for particular scenarios and target sets will also benefit from the present invention. That is, for example only, the maximum range MAX for viewing and identifying a vehicle may be different than for viewing and identifying personnel. Moreover, the sensor may actually be able to "see" past the maximum range, but not with the desired acuity as predefined by the maximum range MAX setting.

The determination to move the UAV rather than slew the sensor 33 LOS is preferably related to the slant range of the LOS and the sensor 33 operational range from a UAV 10 position O, where operational range is defined as:

Minimum range<operational range<maximum range  (Eq. 5)

Figure 8B:
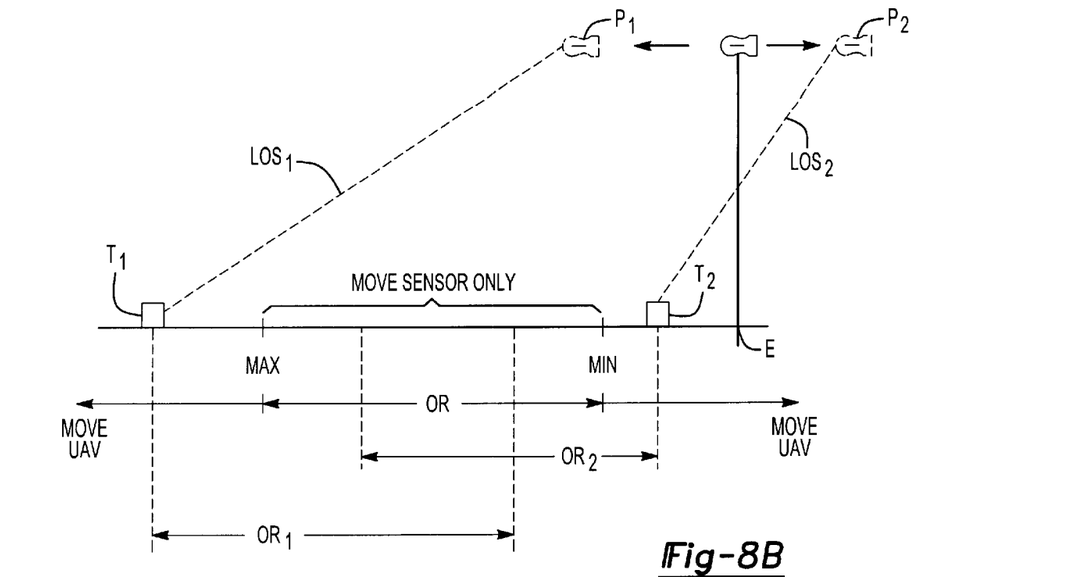
FIG. 8B is a schematic diagram illustrating UAV movement in response to the sensor operational range and targets relative thereto.

When the sensor is commanded to a target T within the operational range the sensor 33 LOS is redirected. That is, the sensor 33 LOS is freely movable within the predetermined sensor range SR. However, commands to increase the sensor elevation once at the maximum range MAX causes the UAV 10 to move toward the target (T1; FIG. 8B) thereby automatically adjusting the sensor LOS to maintain the target within the sensor 33 FOV. Likewise, commands to decrease the sensor elevation once at the minimum range MIN causes the UAV 10 to move away from the target T2 (FIG. 8B) thereby automatically adjusting the sensor LOS to maintain the target within the operational range OR.

The ground distance from the UAV 10 to the center of the sensor 33 FOV (Line O-A) defines a range R, which is calculated as follows:

Range $R$=Tangent(90°+Angle "$A$")*UAV Altitude  (Eq. 6)

Where angle "A" is the elevation angle of the sensor 33, i.e., the angle from vertically straight down from the UAV 10. That is, if the sensor 33 is commanded to slew "up" (increasing the value of angle "A") to view a target T (Figure B) the sensor 33 LOS (center of the sensor 33 FOV) will reach the maximum range prior to viewing the target $T_1$. The UAV will therefore be commanded to move toward the target $T_1$ to a position P' until the center of the sensor 33 FOV at maximum range overlays the target T.

Figures 8C, 9C:
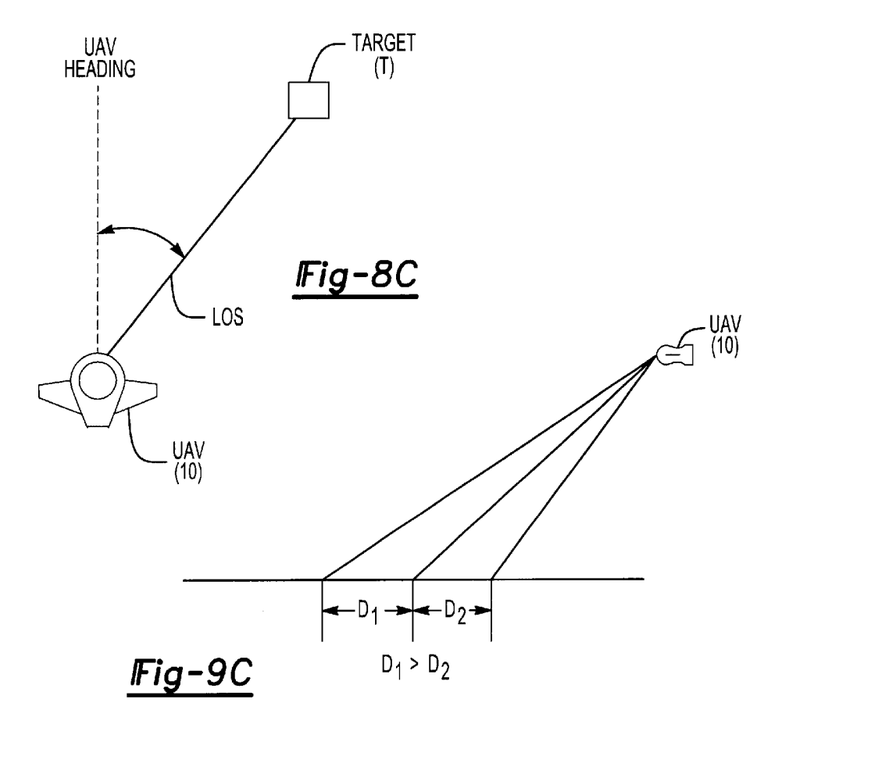
FIG. 8C is a schematic diagram of mission sensor azimuth.
FIG. 9C is a schematic representation of imagery versus actual ground distance.

Preferably, in addition to slewing the sensor elevation, the sensor azimuth offset from front of the UAV (Φ; FIG. 8C) is also utilized to guide movement of the UAV 10. That is, the azimuth orientation of the target T relative the UAV assures that the UAV is properly commanded to move toward or away from the target to maintain the target T within the sensor 33 operational range OR.

Identification of the sensor azimuth offset from front of the UAV provides for UAV 10 movement which maintains the position of the UAV 10 relative to a moving target. That is, if the target is moving, for example only, to the South East, the UAV can be commanded to maintain a position to the South West of the target at the sensor maximum range such that aspect angle to the target does not change. In combination with the teachings of the present invention, such target tracking from a UAV is well within the capabilities of one skilled in the art.

Figure 9A:
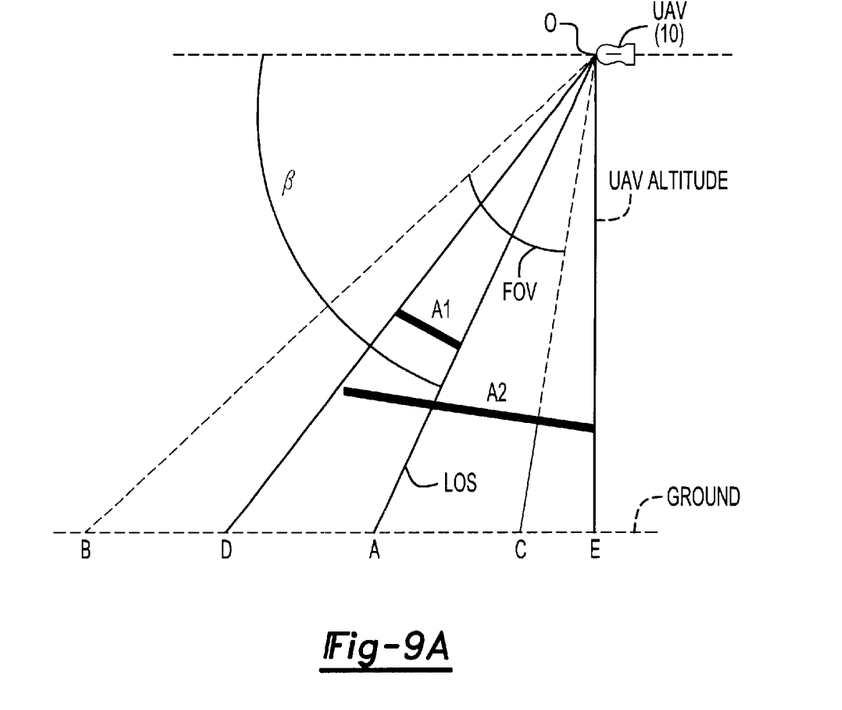
FIG. 9A is a schematic diagram of sensor mission elevation.

Referring to FIG. 9A, another intuitive control requirement for control of the UAV through sensor imagery is translating sensor imagery into true distance. That is, when points are selected on the imagery display from the UAV 10, the actual distances D, $D_2$ along the ground represented by each successive line of video are not equal (FIG. 9C). This effect occurs even if the sensor is looking straight down, just to a lesser extent. The disparity increases as LOS slant angle increases and/or altitude decreases. Such a disparity must be accommodated for to accurately control the UAV 10 through the sensor 33 and the imagery therefrom.

When a point on the imagery is "clicked" (FIG. 9B), the X/Y position of the selected point is determined and associated with a line of video. For example only, a standard RS-170 video includes 480 lines at 640 pixels per line. It should be understood that other imagery displays will also benefit from the present invention. The equivalent distance of each successive imagery line is determined from the position of the UAV 10 to determine the Range and Direction to the selected point. Transforming these values into air vehicle X and Y commands moves the UAV 10 over the desired "clicked" point.

Angle 1 is the angle between the center of the video (point A) and the point on the video which the operator selected (point D). Point A is equivalent to the LOS or the center of the sensor 33 FOV.

Angle1=sensor_elevation_FOV*(0.5−line Y/total image line height)  (Eq. 7)

Where the (0.5−line Y/total image line height) sets the line y value to correct to the center of the screen. Operation of the invention is best understood by example. In this example, the total imagery height is 480 lines and the center of the imagery is at line 240. Thus, if the operator "clicked" at the center of the display (line 240), equation (7) would resolve to:

Angle1=Sensor_Elevation_FOV*(0.5−240/480)

Sensor_Elevation_FOV*0=0

Figure 9B:
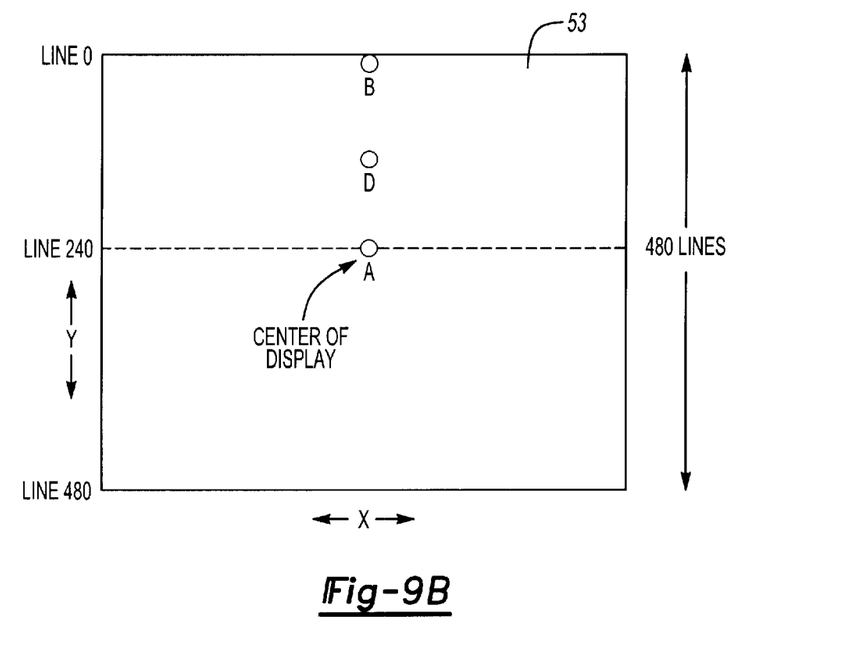
FIG. 9B is an imagery display corresponding with FIG. 9A.

If the operator "clicked" at the very top of the video display (Point B), the result would be:

Angle1=Sensor_Elevation_FOV*(0.5−0/480)

=Sensor_Elevation_FOV*0.5.

That is, Angle1 would be equivalent to one half of the total elevation FOV. Further, if the sensor elevation FOV is 25 degrees, the Sensor_Elevation_Angle (β) is 45 degrees and the operator clicked a point half way between the center of the video and the top of the display (point D; FIG. 9B), Angle1 resolves to: (25)(0.5−120/480)=6.25 degrees.

A vertical line defined between the UAV 10 and the ground is defined as line O-E. The line from the UAV 10 to the point the operator selected is defined as line O-D. The angle between the horizon and line O-E is 90 degrees. By subtracting the sensor_elevation_angle (β) and adding back Angle1, Angle2 is obtained.

Angle2=90°+sensor_elevation_FOV+Angle1  (Eq. 8)

In other words, consider triangles O-E-D and O-E-A where O-E is the UAV altitude which is known. The angle between O-E and O-A is Angle2−Angle 1. Therefore:

Tan(A2)=D-E/Altitude, so length D-E=(altitude)(Tan(A2));

Tan(A2−A1)=A-E/Altitude, so length A-E=(altitude)(Tan(A2−A1));

Length D-A=length D-E−length A-E,

Thus:

Length $D$-$A$=altitude*(tangent[Angle2]−tangent[Angle2−Angle1])  (Eq. 9)

Length D-A is the equivalent ground distance in the Y direction between the center of the display and the point the operator selected by clicking on display 53.

The azimuth offset (X direction offset of the selected point) is much less sensitive to sensor elevation angles. That is, the translation of sensor imagery in the X direction to an actual ground distance is relatively linear. Thus, a ratio of X distance on the display 53 to the actual ground distance is determined. For example only, if the UAV is at an altitude of 100 feet, each pixel in the X direction equals 3 feet on the ground. "Clicking" a point 20 pixels off the X centerline of display 53 translates into 60 feet on the ground when the UAV is at the 100 foot altitude. It should be understood that for rather great azimuth FOV sensors, calculations in accordance with the Y direction compensation will also benefit from the present invention.

Once the distance from the center of the imagery is calculated as described above, moving the UAV and/or slewing the sensor 33 move can the selected point (D, B; FIG. 9B) into the center of the imagery. The decision to slew the sensor and/or move the UAV is readily determined as described above (FIG. 9B). By moving the selected point (D, B; FIG. 9BA) into the center of the imagery the flight control system autonomously directs the UAV to prevent reaching the sensor gimbal lock limits and the possibility of losing visual on the object of interest.

Combining the control system of the present invention with a target tracking systems provides for the UAV to autonomously move to follow the moving target. Well known tracking software in combination with the present invention need only identify a target against a background and provide the position of the target on the image to the present invention. The flight control system of the present invention will then consider the data from the tracing system as a selected point on the image and keep the target in the center of the video image by slewing the sensor and/or moving the UAV as described above.

Combining the flight control system theory of the present invention with digital map information, the flight control system will readily avoid geographic obstacles independently of an operator. It should be understood that other tracking and targeting systems will benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A method of controlling an unmanned air vehicle (UAV) comprising the steps of:
   (1) determining a reference mode;
   (2) determining a reference angle in response to said step (1);
   (3) transforming a control input into a UAV command in response to said step (2);
   (4) commanding a sensor line of sight to a desired elevation angle;
   (5) determining if the sensor line of sight commanded in said step (4) is within a predefined sensor operational range; and
   (6) calculating the UAV command which moves the UAV to maintain the sensor line of sight commanded in said step (4) within the sensor operational range.

2. A method as recited in claim 1, wherein the control input is defined by a stick_X_Cmd and a stick_Y_Cmd, and the UAV command is defined by an X command and a Y command, said step (3) defined by the relationship:

UAV_X_Cmd=(stick_X_Cmd)(Cosine[Reference_Angle])+ (stick_Y_Cmd)(Sine[Reference_Angle])

UAV_Y_Cmd=(stick_Y_Cmd)(Cosine[Reference_Angle])− (stick_X_Cmd)(Sine[Reference_Angle]).

3. A method as recited in claim 1, wherein said step (1) comprises determining between a MAP reference mode and a SENSOR reference mode.

4. A method as recited in claim 3, wherein the reference angle in the MAP reference mode of said step (2) is determined by the relationship:

Reference angle=Map orientation−UAV heading.

5. A method as recited in claim 3, wherein the reference angle in the SENSOR reference mode of said step (2) is determined by the relationship:

Reference angle=Sensor Azimuth−UAV heading.

6. A method as recited in claim 1, wherein said step (6) comprises calculating the UAV command which moves the UAV to maintain the sensor line of sight commanded in said step (4) at the center of the sensor operational range.

7. A method as recited in claim 1, further comprising the steps of:
   (7) tracking a target; and
   (8) calculating the UAV command which moves the UAV to maintain the target within a sensor field of view when the target leaves the sensor operational range.

8. A method controlling an unmanned air vehicle (UAV) comprising the steps of:
   (1) determining a reference mode;
   (2) determining a reference angle in response to said step (1);
   (3) transforming a control input into a UAV command in response to said step (2);
   (4) commanding a sensor line of sight to a desired elevation angle;
   (5) confirming that the sensor line of sight commanded in said step (4) is within a predefined sensor operational range; and
   (6) slowing a sensor to the sensor line of sight commanded in said step (4).

9. A method as recited in claim 8, wherein the range to where the sensor line of sight commanded in said step (4) intersects the ground is determined by the relationship:

Range=Tangent (90°+"sensor elevation angle")*UAV Altitude

Where "sensor elevation angle" is the elevation angle of a mission sensor from vertically straight down.

10. A method of controlling an unmanned air vehicle (UAV) through an imagery from an onboard mission sensor comprising the steps of:
    (1) selecting a point on a display;
    (2) determining an angle 1 line, the angle 1=sensor_ elevation_FOV*(0.5−line Y of the point/total image line height);
    (3) determining an angle 2;
    (4) determining a true ground distance equivalent to the display distance from a Y centerline of the display to the point on the display with angle 1 and angle 2; and (5) controlling a position of the UAV in response to said step (4).

11. A method of controlling an unmanned air vehicle (UAV) through an imagery from an onboard mission sensor comprising the steps of:
   (1) selecting a point on a display;
   (2) determining an angle 1 line;
   (3) determining an angle 2, the angle 2=90°+sensor_elevation_FOV+angle 1;
   (4) determining a true ground distance equivalent to the display from a Y centerline of the display to the point on the display with angle 1 and angle 2; and
   (5) controlling a position of the UAV in response to said step (4).

12. A method of controlling an unmanned air vehicle (UAV) through an imagery from an onboard mission sensor comprising the steps of:
   (1) selecting a point on a display;
   (2) determining an angle 1 line;
   (3) determining an angle 2;
   (4) determining a true ground distance equivalent to the display distance from a Y centerline of the display to the point on the display with angle 1 and angle 2, the ground distance=UAV altitude*(tangent[Angle2]-tangent[Angle2-Angle1]); and
   (5) controlling a position of the UAV in response to said step (4).

13. A method of controlling an unmanned air vehicle (UAV) through an imagery from an onboard mission sensor comprising the steps of:
   (1) selecting a point on a display;
   (2) determining an angle 1 line;
   (3) determining an angle 2;
   (4) determining a true ground distance equivalent to the display distance from a Y centerline of the display to the point on the display with angle 1 and angle 2 and determining a true ground distance equivalent to the X display distance between the point on the display and an X centerline of the display; and
   (5) controlling a position of the UAV in response to said step (4).

14. A method as recited in claim 13, further comprising the steps of:
   (a) determining a UAV altitude;
   (b) determining a number of pixels between the point and the X- centerline of the display; and
   (c) determining a fixed ratio between one of the number of pixels from said step (b) and a true ground distance in relation to the UAV altitude.

15. A method of controlling an unmanned air vehicle (UAV) through an imagery form an onboard mission sensor comprising the steps of:
   (1) selecting a point on a display;
   (2) determining an angle 1 line;
   (3) determining an angle 2;
   (4) determining a true ground distance equivalent to the display distance from a Y centerline of the display to the point on the display with angle 1 and angle 2;
   (5) commanding a sensor line of sight to a desired elevation angle by selecting the point on the display;
   (6) determining if the sensor line of sight commanded in said step (5) is within a predefined sensor operational range; and
   (7) calculating a UAV command which moves the UAV to maintain the sensor line of sight commanded in said step (5) within the sensor operational range.

16. A method as recited in claim 15, wherein said step (7) comprises calculating the UAV command which moves the UAV to maintain the point at the center of the display.

17. A method of controlling an unmanned air vehicle (UAV) through an imagery from an onboard mission sensor comprising the steps of:
   (1) selecting a point on a display;
   (2) determining an angle 1 line;
   (3) determining an angle 2;
   (4) determining a true ground distance equivalent to the display distance from a Y centerline of the display to the point on the display with angle 1 and angle 2;
   (5) commanding a sensor line of sight to a desired elevation angle by selecting the point on the display; and
   (6) calculating a UAV command which moves the UAV to maintain the point at the center of the display.

18. A method as recited in claim 17, wherein said step (5) is commanded by a target tracking system.

* * * * *

UNITED STATES PATENT AND TRADEMARK OFFICE
CERTIFICATE OF CORRECTION

PATENT NO.   : 6,694,228 B2
DATED        : February 17, 2004
INVENTOR(S)  : Rios It is certified that error appears in the above-identified patent and that said Letters Patent is hereby corrected as shown below:

<u>Column 12,</u>
Line 42, "slowing" should read as -- slewing --.

Signed and Sealed this

Fifteenth Day of June, 2004

JON W. DUDAS
*Acting Director of the United States Patent and Trademark Office*